(12) United States Patent
Katahira et al.

(10) Patent No.: US 9,981,509 B2
(45) Date of Patent: May 29, 2018

(54) GUIDE WHEEL, STEERING BOGIE, AND VEHICLE

(71) Applicant: MITSUBISHI HEAVY INDUSTRIES, LTD., Tokyo (JP)

(72) Inventors: Kousuke Katahira, Tokyo (JP); So Tamura, Tokyo (JP); Mitsuaki Hoshi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 125 days.

(21) Appl. No.: 15/101,670

(22) PCT Filed: Jul. 17, 2014

(86) PCT No.: PCT/JP2014/069048
§ 371 (c)(1),
(2) Date: Jun. 3, 2016

(87) PCT Pub. No.: WO2015/087574
PCT Pub. Date: Jun. 18, 2015

(65) Prior Publication Data
US 2016/0355059 A1    Dec. 8, 2016

(30) Foreign Application Priority Data
Dec. 12, 2013  (JP) .................................. 2013-257453

(51) Int. Cl.
*B61B 13/00* (2006.01)
*B60C 11/24* (2006.01)
(Continued)

(52) U.S. Cl.
CPC ................ *B60C 11/24* (2013.01); *B60C 7/00* (2013.01); *B61B 13/00* (2013.01); *B61F 5/50* (2013.01); *B61F 9/00* (2013.01); *B60C 2019/006* (2013.01)

(58) Field of Classification Search
CPC ...... B61F 5/10; B61F 5/52; B61F 5/50; B61F 5/148; B61F 5/46; B61F 9/00; B61F 3/16;
(Continued)

(56) References Cited

U.S. PATENT DOCUMENTS

2011/0265683 A1* 11/2011 Kurahashi ............... B61B 10/04
                                                          105/215.2
2011/0271868 A1* 11/2011 Kurahashi ............... B61B 10/04
                                                          105/141
(Continued)

FOREIGN PATENT DOCUMENTS

JP      S52-084603 A    7/1977
JP      S53-019901 U    2/1978
(Continued)

OTHER PUBLICATIONS

PCT/ISA/210, "International Search Report for International Application No. PCT/JP2014/069048," dated Oct. 14, 2014.
(Continued)

*Primary Examiner* — Jason C Smith
(74) *Attorney, Agent, or Firm* — Manabu Kanesaka; Benjamin Hauptman; Kenneth Berner

(57) ABSTRACT

A guide wheel (33) for guiding a vehicle along a track is equipped with an annular tread section (61) that comes into contact with a guide rail extending along the track and a pair of sidewall sections (62) that are formed continuing from both edges of the tread section (61) in the axial direction and extend inward in the radial direction, said guide wheel (33) being characterized in that protrusions (63a, 63b) are formed over the entire circumference of each of the sidewall sections (62).

6 Claims, 10 Drawing Sheets

(51) Int. Cl.
*B60C 7/00* (2006.01)
*B61F 9/00* (2006.01)
*B61F 5/50* (2006.01)
*B60C 19/00* (2006.01)

(58) Field of Classification Search
CPC .......... B60C 11/24; B60C 7/00; B61B 13/00; B61B 13/04
See application file for complete search history.

(56) References Cited

U.S. PATENT DOCUMENTS

| | | | | |
|---|---|---|---|---|
| 2012/0017800 | A1* | 1/2012 | Kurahashi | B61B 10/04 105/182.1 |
| 2012/0031298 | A1* | 2/2012 | Kurahashi | B61B 10/04 105/215.2 |
| 2012/0097065 | A1* | 4/2012 | Maeyama | B62D 1/265 105/177 |
| 2012/0103227 | A1* | 5/2012 | Maeyama | B61B 13/00 104/245 |
| 2012/0181805 | A1* | 7/2012 | Maeyama | B61F 5/325 295/1 |
| 2015/0314796 | A1* | 11/2015 | Maeyama | B61B 13/04 701/19 |
| 2015/0353104 | A1* | 12/2015 | Maeyama | B61B 13/00 701/19 |
| 2015/0353106 | A1* | 12/2015 | Maeyama | B62D 1/265 74/89.14 |
| 2016/0052529 | A1* | 2/2016 | Tachibana | B61B 13/00 105/215.1 |
| 2016/0069033 | A1* | 3/2016 | Katahira | E01H 5/092 104/279 |
| 2016/0207548 | A1* | 7/2016 | Katahira | B61B 13/00 |
| 2016/0251002 | A1* | 9/2016 | Katahira | B61B 13/00 105/182.1 |
| 2016/0257315 | A1* | 9/2016 | Yanobu | B61F 5/38 |
| 2016/0264156 | A1* | 9/2016 | Yanobu | B61B 13/04 |
| 2016/0272222 | A1* | 9/2016 | Katahira | B61B 13/00 |
| 2016/0355059 | A1* | 12/2016 | Katahira | B61F 9/00 |
| 2017/0158210 | A1* | 6/2017 | Katahira | B61F 5/52 |

FOREIGN PATENT DOCUMENTS

| | | |
|---|---|---|
| JP | S53-104507 U | 8/1978 |
| JP | S54-163402 U | 11/1979 |
| JP | S58-030723 Y2 | 7/1983 |
| JP | S59-025684 Y2 | 7/1984 |
| JP | H03-236911 A | 10/1991 |
| JP | H04-109605 U | 9/1992 |
| JP | H08-091768 A | 4/1996 |
| JP | H08-197901 A | 8/1996 |
| JP | 3044261 U | 12/1997 |
| JP | 3071490 U | 9/2000 |
| JP | 2005-514260 A | 5/2005 |
| JP | 2006-062584 A | 3/2006 |
| JP | 2006-232152 A | 9/2006 |
| JP | 2011-084127 A | 4/2011 |
| JP | 2013-147085 A | 8/2013 |
| JP | 2013-240928 A | 12/2013 |

OTHER PUBLICATIONS

PCT/ISA/237, "Written Opinion of the International Searching Authority for International Application No. PCT/JP2014/069048," dated Oct. 14, 2014.
Japan Patent Office, "Office Action for Japanese Patent Application No. 2013-257453," dated Apr. 25, 2014.
Japan Patent Office, "Office Action for Japanese Patent Application No. 2013-257453," dated Sep. 30, 2014.

\* cited by examiner

GUIDE WHEEL, STEERING BOGIE, AND VEHICLE

TECHNICAL FIELD

The present invention relates to a guide wheel, a steering bogie, and a vehicle.

Priority is claimed based on Japanese Patent Application No. 2013-257453, filed on Dec. 12, 2013, the content of which is incorporated herein by reference.

BACKGROUND ART

As new transportation means other than a bus or a railroad, a track based transportation system which travels on a track by running wheels each composed of a rubber tire or the like is known. Such a track based transportation system is generally called a new transportation system or an automated people mover (APM).

A vehicle of this kind of track based transportation system is provided with running wheels connected to an axle, and a steering guide device having guide wheels which roll in contact with guide rails provided along a track, and is made such that the guide wheels of the steering guide device are guided by the guide rails, whereby the respective running wheels are steered and travel on the track.

The steering guide device is provided with a guide frame extending along a vehicle width direction, and the guide wheels described above are rotatably provided in a state of being eccentric with respect to shaft centers of wheel shafts disposed at both end portions of the guide frame.

In the vehicle of the track based transportation system described above, it is necessary to adjust a guide width of the steering guide device (a distance between the outermost portions of the guide wheels which are located at both end portions in the vehicle width direction) within a desired range. In a case where the guide width is narrower than a desired width, a gap between the guide wheel and the guide rail is increased, and thus there is a concern that smooth steering of the running wheel may not be performed. Further, in a case where the guide width is wider than a desired width, there is a concern that it may lead to damage to the guide wheel or damage to the guide frame or the guide rail.

Therefore, in the steering guide device, maintenance is performed so as to keep the guide width constant by moving the guide wheel to the outside in the vehicle width direction around the shaft center of the wheel shaft as the wear of the guide wheel increases.

CITATION LIST

Patent Literature

[PTL 1] Japanese Unexamined Utility Model Registration Application Publication No. 53-19901

SUMMARY OF INVENTION

Technical Problem

Incidentally, in a tire which is used in a vehicle such as an automobile, as a configuration of indicating a wear situation of a tread section, a configuration in which a wear indicator is provided at a portion in a circumferential direction in a groove of the tread section is known (refer to, for example, PTL 1).

However, in the guide wheel which is used in the track based transportation system described above, consideration for the formation of a wear indicator in the guide wheel is not given. In this case, a wear limit of the guide wheel is so small (for example, about 3 mm) that it is difficult to visually determine it, and therefore, it is necessary to measure a wear situation by using a scale, a jig, or the like. Therefore, there is a problem in that maintenance work becomes complicated.

Further, a wear rate of the guide wheel varies at each position. For this reason, it is necessary to measure the degree of wear for each guide wheel and adjust an eccentric position for each guide wheel. Also due to this, maintenance work becomes complicated.

Therefore, the present invention has been made in view of the above-described circumstances and has an object to provide a guide wheel, a steering bogie, and a vehicle, in which a wear situation can be easily determined, and thus it is possible to improve maintainability.

Solution to Problem

In order to solve the above problem, according to a first aspect of the present invention, there is provided a guide wheel for guiding a vehicle along a track including: an annular tread section which comes into contact with a guide rail extending along the track; and a pair of sidewall sections which are respectively provided to be continuous with both end edges in an axial direction of the tread section and extend inward in a radial direction, wherein in each sidewall section, a wear indicator is provided over the entire circumference in a circumferential direction.

Then, according to the guide wheel having such a configuration, the wear indicator is formed at the sidewall section of the guide wheel, whereby it is possible to check the wear situation of the guide wheel by visual observation. Accordingly, compared to a case of checking the wear situation by using a scale, a jig, or the like, as in the related art, maintenance work becomes easy, and thus it is possible to attain improvement in maintainability.

Further, the limit of wear can be determined based on the distances between the tread section and the wear indicator along the radial direction. Therefore, it becomes easy to perform the management of a time for replacement, an adjustment time of the eccentric position, or the like for each guide wheel.

In addition, the wear indicator is provided at the sidewall section. Accordingly, with respect to the guide wheels provided such that the axial directions coincide with each other in the up-and-down direction, it is possible to check the wear situation in a planar view when the guide wheels are viewed from the axial direction. Therefore, for example, compared to a case where a wear indicator is provided in the tread section of the guide wheel and the wear situation is checked in a side view as viewed from the radial direction of the guide wheel, it is possible to further improve maintainability.

Incidentally, a guide wheel which is used in a vehicle of a track based transportation system is not always rotating during the traveling of the vehicle and begins to rotate at the point of time when it has come into contact with the guide rail. Therefore, there is a concern that so-called abnormal wear in which the wear situation of the tread section varies in the circumferential direction may occur. As an example of the abnormal wear, there is polygonal wear in which the tread section is worn away in a polygonal shape in a planar view as viewed from the axial direction, flat wear in which a portion of the tread section is locally worn away in a planar shape, or the like.

However, in the guide wheel according to the present invention, the wear indicator is formed over the entire circumference of the sidewall section. Due to this configuration, in a case where the abnormal wear has occurred, the occurrence of the abnormal wear can be easily determined based on the distance between an occurrence portion of the abnormal wear along the radial direction and the wear indicator being different from the distance between a portion other than the occurrence of the abnormal wear and the wear indicator.

Further, in a second aspect of the present invention, the wear indicators in the first aspect may be provided in a plurality at intervals in the radial direction.

According to this configuration, the plurality of wear indicators are provided at intervals in the radial direction, and therefore, it also becomes possible to determine the wear situation of the tread section in stages. In this way, it is possible to appropriately determine an adjustment time of the eccentric position, a time for replacement, or the like of the guide wheel.

Further, in a third aspect of the present invention, the wear indicator in the first or second aspect may have a concave shape or a protrusion shape along the axial direction.

According to this configuration, the wear indicator has a concave shape or a protrusion shape along the axial direction, and therefore, it becomes easy to visually determine the wear situation.

Further, according to a fourth aspect of the present invention, there is provided a guide wheel for guiding a vehicle along a track including: an annular tread section which comes into contact with a guide rail extending along the track; and a pair of sidewall sections which are respectively provided to be continuous with both end edges in an axial direction of the tread section and extend inward in a radial direction, wherein a wear indicator which is recessed inward in the radial direction and in which a shape in a side view of the tread section when viewed from the radial direction changes according to wear is provided in the tread section.

According to this configuration, the wear indicator in which the shape in a side view of the tread section when viewed from the radial direction changes according to the wear situation of the tread section is provided, and therefore, it is possible to check the wear situation of the guide wheel by visual observation. Accordingly, compared to a case of checking the wear situation by using a scale, a jig, or the like, as in the related art, maintenance work becomes easy, and thus it is possible to attain improvement in maintainability.

Further, the limit of wear can be determined based on the shape in a side view of the tread section when viewed from the radial direction. Therefore, it becomes easy to perform the management of a time for replacement, an adjustment time of the eccentric position, or the like for each guide wheel.

Further, in a fifth aspect of the present invention, the wear indicator in the fourth aspect may be provided with a plurality of hole portions in which depths along the radial direction are different.

According to this configuration, in a case where the wear of the tread section has progressed from the initial state which is a state where the plurality of hole portions are exposed to the outside, the hole portions gradually disappear from the hole portions having a shallower depth. In this way, it is possible to check the wear situation of the tread section by visual observation, and thus it is possible to attain improvement in maintainability.

Further, in a sixth aspect of the present invention, the wear indicator in the fourth or fifth aspect may be provided with a hole portion having an inner diameter which is reduced as it goes inward in the radial direction.

According to this configuration, the inner diameter of the hole portion which is exposed to the outside changes according to the progress of wear. In this way, the shape in a side view of the tread section when viewed from the radial direction changes according to the wear situation of the tread section, and therefore, it is possible to check the wear situation of the tread section by visual observation.

Further, in a seventh aspect of the present invention, the wear indicator in the fourth or fifth aspect may be provided with a groove portion extending over the entire circumference of the tread section and having a width which is reduced as it goes inward in the radial direction.

According to this configuration, the width of the groove portion which is exposed to the outside changes according to the progress of wear.

In this way, the shape in a side view of the tread section when viewed from the radial direction changes according to the wear situation of the tread section, and therefore, it is possible to check the wear situation of the tread section by visual observation.

Further, in an eighth aspect of the present invention, the guide wheel in each of the above aspects may be configured of a material having light permeability.

According to this configuration, the guide wheel is formed of a material having light permeability, and therefore, the inside of the guide wheel becomes visible. In this case, for example, with respect to the guide wheels provided such that the axial directions coincide with each other in the up-and-down direction, the wear situations of the hole portions formed in the tread section can be checked in a planar view when the guide wheel is viewed from above. In this way, it is possible to attain improvement in maintainability.

Further, a steering bogie according to each of the above aspects includes: running wheels connected to an axle; and a steering guide device which is guided by the guide rails, wherein the steering guide device has the guide wheel according to the present invention.

According to this configuration, a steering bogie in which maintainability is excellent and stable traveling is possible can be provided, because the steering bogie is provided with the guide wheel according to the present invention.

Further, a vehicle according to each of the above aspects includes: a car body; and the steering bogie according to the present invention, which is provided at a lower portion of the car body.

According to this configuration, a vehicle in which maintainability is excellent and stable traveling is possible can be provided, because the vehicle is provided with the guide wheel according to the present invention.

Advantageous Effects of Invention

In the guide wheel, the steering bogie, and the vehicle, the wear situation can be easily determined, and thus it is possible to improve maintainability.

DESCRIPTION OF EMBODIMENTS

Next, embodiments of the present invention will be described based on the drawings.

[First Embodiment]

Figure 1:
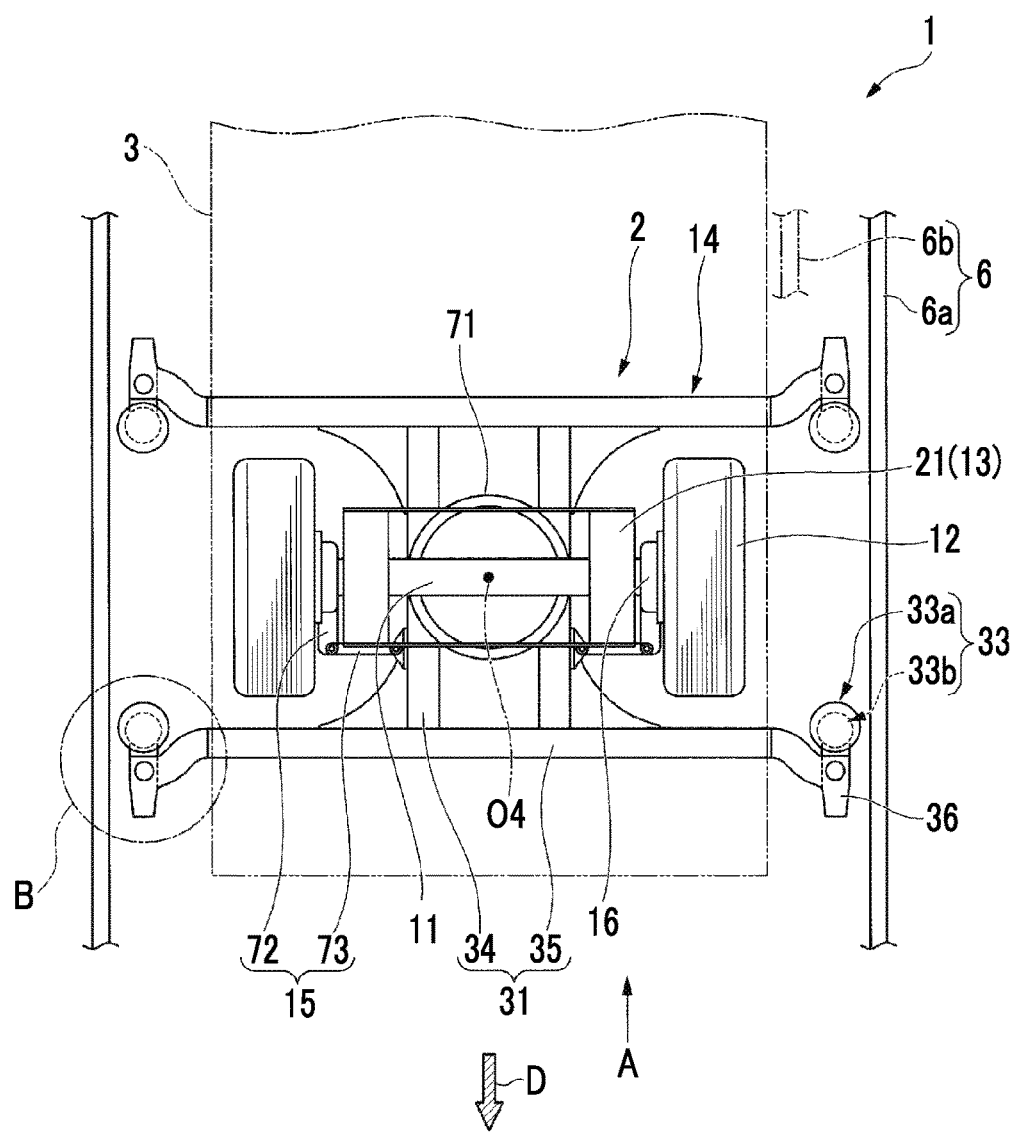
FIG. 1 is a plan view of a vehicle according to each embodiment of the present invention.
Figure 2:
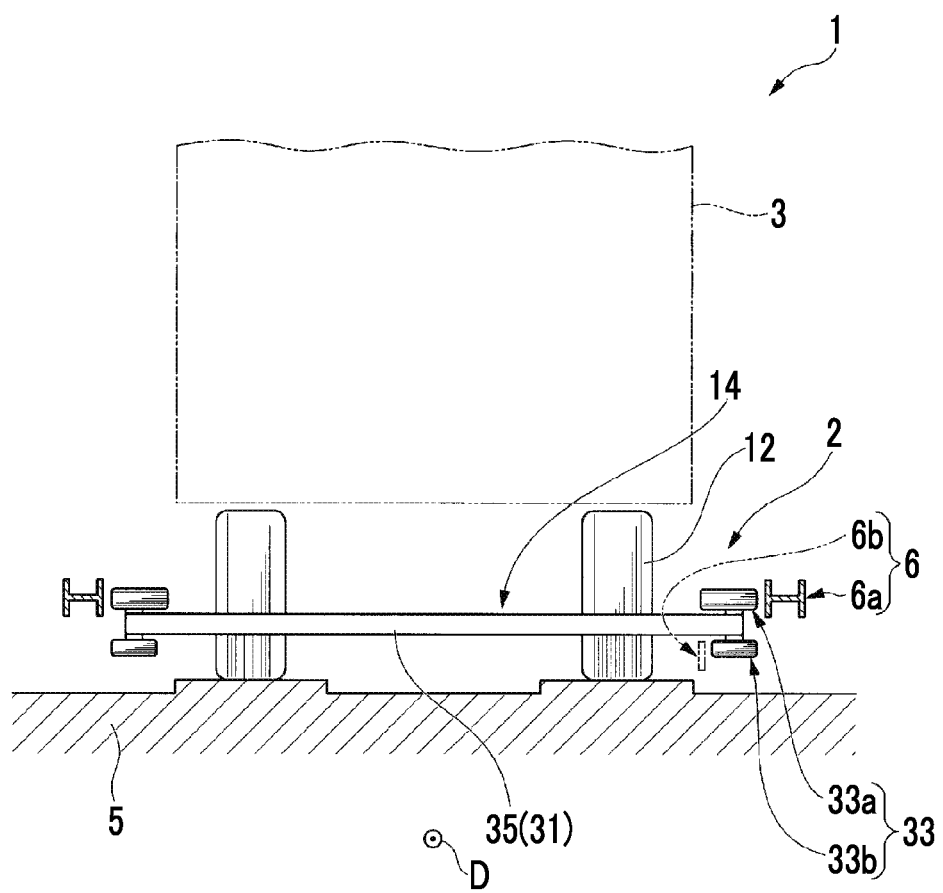
FIG. 2 is a view in the direction of an arrow A of FIG. 1.

As shown in FIGS. 1 and 2, a vehicle 1 is a vehicle of a track based transportation system, which travels on a track 5 (refer to FIG. 2) while being guided by guide rails 6 provided at the track 5. In this embodiment, the vehicle 1 is a vehicle of a lateral guide rail type (side guide type) transportation system in which the guide rails 6 extending along an extending direction of the track 5 are provided on both sides in a width direction of the track 5.

Further, the guide rail 6 is provided with a main guide rail 6a disposed on each of both sides of the track 5, and a switching guide rail 6b which is provided at a switching section, at which the track 5 branches, and is located below the main guide rail 6a. In addition, the switching guide rail 6b is disposed only at the switching section of the track 5. However, in the illustrated example, for convenience, the switching guide rail 6b is shown by a chain line.

<Vehicle>

The vehicle 1 is provided with a steering bogie 2 which travels on the track 5, and a car body 3 supported on the steering bogie 2.

In addition, directions such as the front-and-back, up-and-down, and right-and-left directions in the following description are set to be the same as the directions in the vehicle 1 unless otherwise specified. Further, in the following, the direction of an arrow D along the front-and-back direction of the vehicle 1 is set to be a forward direction, and the opposite direction to the direction of the arrow D is set to be a backward direction.

The car body 3 has a rectangular parallelepiped shape long in the front-and-back direction. A space in which passengers can be accommodated is formed in the interior of the car body 3. Further, the steering bogies 2 described above are provided in a pair in the front and rear of a lower portion of the car body 3. In addition, the steering bogie 2 on the front side and the steering bogie 2 on the rear side have the same configuration except that the forward and backward directions are reverse, and therefore, in the following, the steering bogie 2 on one side (the front side) will be described as a representative.

<Steering Bogie>

The steering bogie 2 is provided with tires (running wheels) 12 connected to both end portions of an axle 11, a suspension device 13 which rotatably supports the axle 11, a steering guide device 14 which is guided by the guide rails 6, and a steering mechanism 15 (refer to FIG. 1) which steers the tires 12 according to the displacement of the steering guide device 14.

At each of both end portions of the axle 11, a axle hub 16 is provided through a kingpin (not shown). The kingpin functions as a steering shaft of the tire 12. The kingpin extends along the up-and-down direction and supports the axle hub 16 so as to be able to oscillate around the kingpin with respect to the axle 11. Further, the tire 12 described above is mounted on each axle hub 16. The tire 12 is made of a material having elasticity, such as rubber, and is of a single tire type mounted by one on each axle hub 16. In addition, as the tire 12, for example, a core type tire 12 with a core accommodated therein may be used, and a core-less tire 12 which is used in a general truck, bus, or the like may be used.

As shown in FIG. 1, the suspension device 13 has an axle support body 21 which rotatably supports the axle 11, a pair of right and left air springs (not shown) disposed between the axle support body 21 and the car body 3, and a link mechanism (not shown) which supports the axle support body 21 so as to be able to be displaced in the up-and-down direction with respect to the car body 3.

As shown in FIGS. 1 and 2, the steering guide device 14 is provided with a guide frame 31 disposed below the suspension device 13, and guide wheels 33 (a main guide wheel 33a and a switching guide wheel 33b) rotatably supported on the guide frame 31.

The guide frame 31 is assembled in an approximately #-shape in a planar view as viewed from the up-and-down direction. That is, the guide frame 31 is provided with a pair of right and left longitudinal beams 34 extending along the front-and-back direction, and a pair of cross beams 35 which are respectively connected to both end portions along the front-and-back direction of the longitudinal beams 34 and extend along the right-and-left direction.

Both end portions in the front-and-back direction of the longitudinal beams 34 are located further toward the outside than the tires 12. The cross beams 35 are respectively connected to both end portions.

Both end portions in the right-and-left direction of each cross beam 35 are located further toward the outside than each tire 12. The respective cross beams 35 are disposed so as to sandwich the tires 12 therebetween from both sides in the front-and-back direction. In each cross beam 35, the guide wheels 33 are respectively mounted on both end portions in the right-and-left direction through a guide wheel support arm 36.

Figure 3:
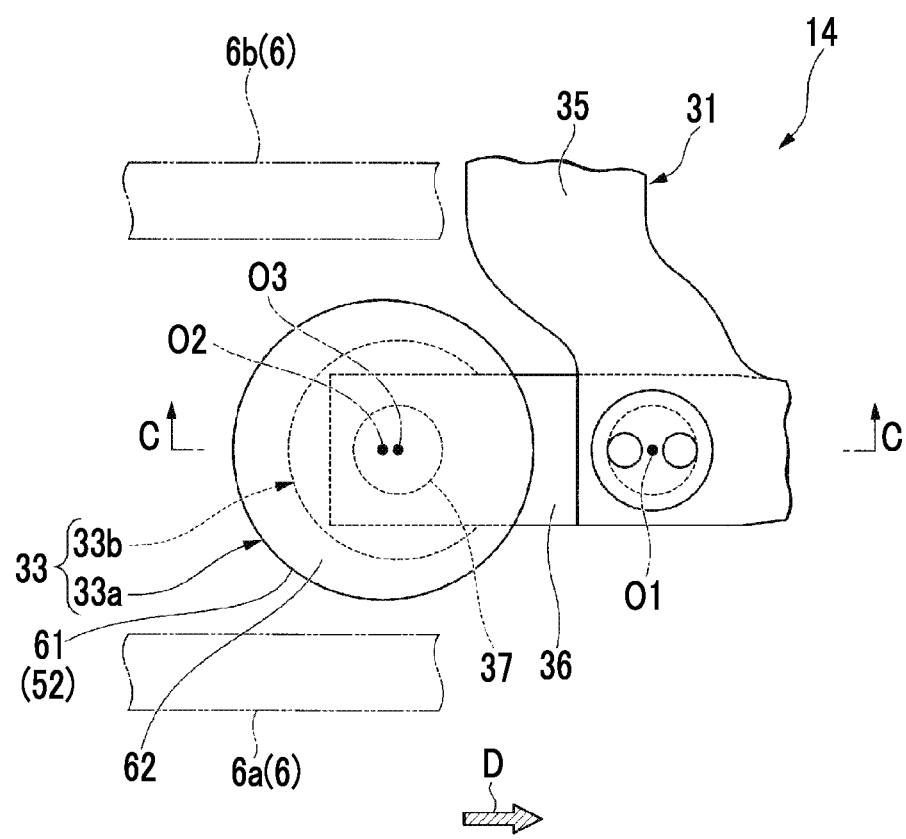
FIG. 3 is an enlarged plan view in a portion B of FIG. 1.
Figure 4:
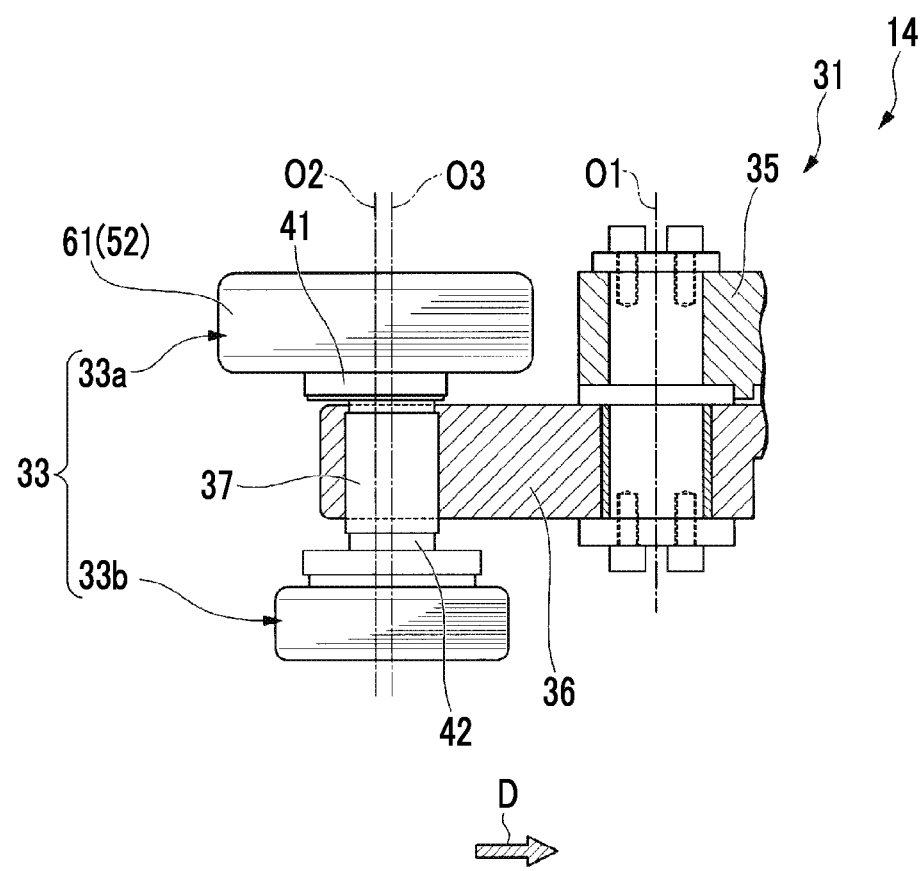
FIG. 4 is a partial cross-sectional view taken along line C-C of FIG. 3.

As shown in FIGS. 3 and 4, a base end portion of the guide wheel support arm 36 is supported so as to be able to oscillate around an arm axis O1 extending along the up-and-down direction, with respect to the cross beam 35. A wheel shaft 37 which penetrates the guide wheel support arm 36 in the up-and-down direction is provided at a tip portion of the guide wheel support arm 36.

As shown in FIG. 4, a main guide wheel shaft 41 which rotatably supports the main guide wheel 33a is connected to an upper end portion of the wheel shaft 37, and a switching guide wheel shaft 42 which rotatably supports the switching guide wheel 33b is connected to a lower end portion of the wheel shaft 37.

The main guide wheel shaft 41 is connected to the wheel shaft 37 on a shaft center O2 which is eccentric with respect to a shaft center O3 of the wheel shaft 37. Further, the main guide wheel shaft 41 is connected to the wheel shaft 37 through an adjustment mechanism (not shown) and is made so as to be able to adjust the eccentric position thereof around the shaft center O3 of the wheel shaft 37. In this embodiment, the shaft center O2 of the main guide wheel shaft 41 can be adjusted at three stages; to an initial position (refer to FIG. 3) at which the shaft center O2 is spaced apart from the shaft center O3 of the wheel shaft 37 in the front-and-back direction, a final position (refer to FIG. 6) at which the shaft center O2 is located on the outside of the shaft center O3 of the wheel shaft 37 in the right-and-left direction, and an intermediate position (refer to FIG. 5) which is located between the initial position and the final position.

Figure 7A:
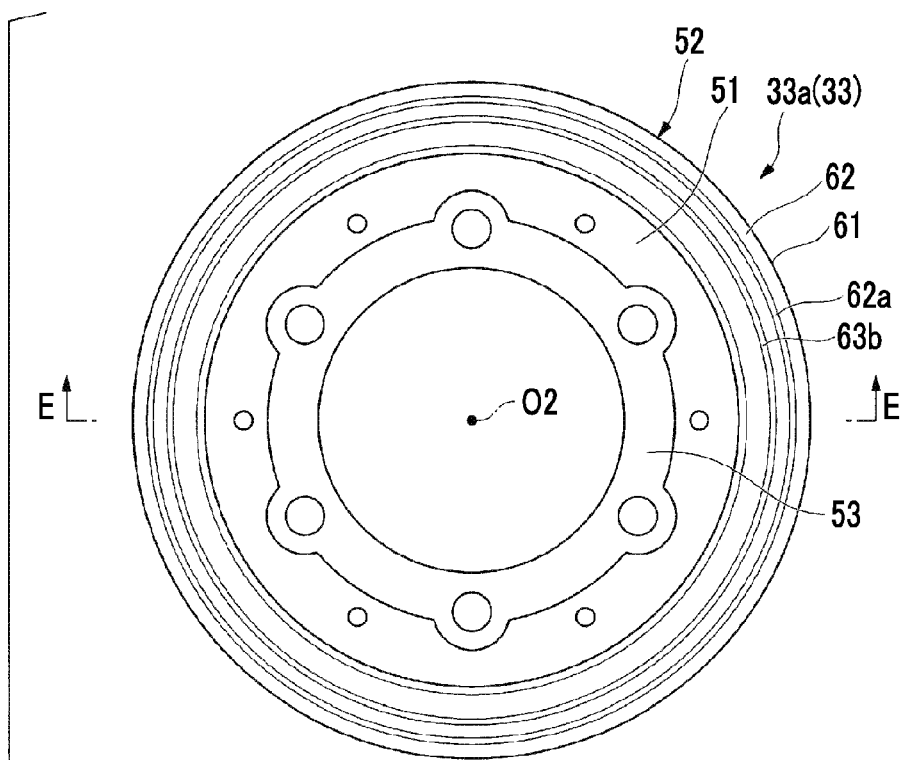
FIG. 7(a) is a plan view of a main guide wheel in a first embodiment.
Figure 7B:
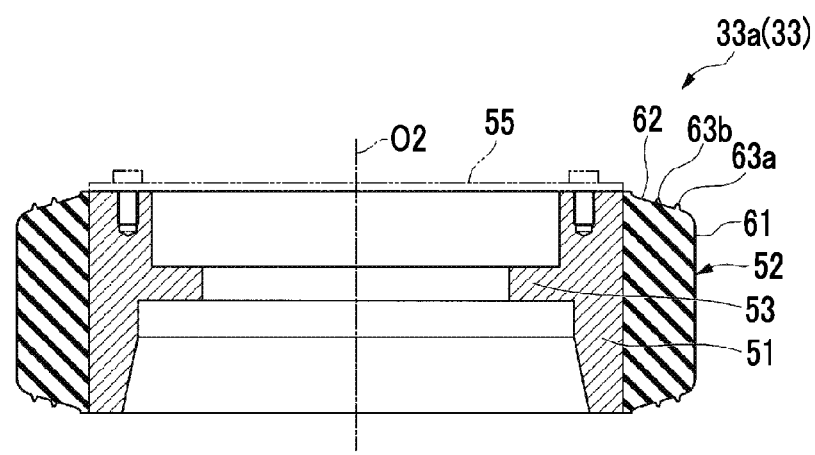
FIG. 7(b) is a cross-sectional view taken along line E-E of FIG. 7(a).

As shown in FIG. 7, the main guide wheel 33a is provided with a tubular core metal section 51 and a wheel main body 52 integrally joined to the outer peripheral surface of the core metal section 51. In addition, in the following description, the direction of the shaft center O2 of the main guide wheel shaft 41 is expressed simply as an axial direction, the direction perpendicular to the shaft center O2 is expressed as a radial direction, and the direction circling around the shaft center O2 is expressed as a circumferential direction. In this case, the axial direction coincides with the up-and-down direction of the vehicle 1.

The core metal section 51 extends along the same axis as the shaft center O2 of the main guide wheel shaft 41 described above, and an inner flange portion 53 protruding inward in the radial direction is provided at a central portion in the axial direction.

Further, a bearing (not shown) is disposed at a portion which is located further toward the lower side than the inner flange portion 53, of the core metal section 51. The main guide wheel 33a is rotatably supported on the main guide wheel shaft 41 described above, through the bearing. Further, a lid section 55 (refer to FIG. 7(b)) is fixed to the core metal section 51 so as to cover the core metal section 51 from above. The lid section 55 prevents entry of dust, water, or the like into the core metal section 51 (the bearing or the like).

The wheel main body 52 is configured of a transparent or semi-transparent material (for example, an elastic body such as urethane rubber or nylon) or the like having light permeability and has a solid tubular shape. In this way, the inside becomes visible from the outside. Further, the inner peripheral surface of the wheel main body 52 is integrally joined to the outer peripheral surface of the core metal section 51 by cure adhesion or the like. Specifically, the wheel main body 52 is provided with an annular tread section 61 which comes into contact with the main guide rail 6a, and a pair of sidewall sections 62 which are respectively provided to be continuous with both end edges of the tread section 61 along the axial direction and extend inward in the radial direction.

The tread section 61 has a flat surface extending along the axial direction.

Each sidewall section 62 is inclined inward in the axial direction as it goes outward in the radial direction. Therefore, in the wheel main body 52, a tire width along the axial direction is gradually narrowed as it goes outward in the radial direction.

Here, at each sidewall section 62, a plurality of protrusions 63a and 63b protruding outward in the axial direction are formed integrally with the wheel main body 52. Each of the protrusions 63a and 63b is a wear indicator for determining the wear situation of the wheel main body 52. Each protrusion 63a and 63b is formed in an annular shape over the entire circumference in the circumferential direction of each sidewall section 62 and has a triangular shape in which the width in the radial direction is gradually reduced as it goes outward in the axial direction, in a side view as viewed from the radial direction.

The protrusions 63a and 63b include a first protrusion 63a disposed to be spaced apart inward in the radial direction from the tread section 61, and a second protrusion 63b disposed to be spaced apart inward in the radial direction from the first protrusion 63a. The respective protrusions 63a and 63b are coaxially formed, and the distance between the tread section 61 and the first protrusion 63a and the distance along the radial direction between the protrusions 63a and 63b are made to be the same (for example, about 3 mm).

As shown in FIG. 4, the switching guide wheel shaft 42 is coaxially connected to the wheel shaft 37 and rotatably supports the switching guide wheel 33b through a bearing (not shown). Further, the switching guide wheel 33b can adopt the same configuration as the main guide wheel 33a described above, except that the switching guide wheel 33b is formed in a smaller diameter than the main guide wheel 33a described above, and therefore, the detailed description thereof is omitted. Further, in this embodiment, a case where the wheel shaft 37, the main guide wheel shaft 41, and the switching guide wheel shaft 42 are formed as separate bodies has been described. However, a configuration may be adopted in which the wheel shaft 37, the main guide wheel shaft 41, and the switching guide wheel shaft 42 are integrally formed and the main guide wheel shaft 41 among them has a crankshaft eccentric with respect to the shaft center O3 of the wheel shaft 37.

As shown in FIG. 1, the guide frame 31 described above is turnably supported on the suspension device 13 (the axle support body 21) through a turning bearing 71. One of an outer ring and an inner ring of the turning bearing 71 is fixed to the axle support body 21 and the other is fixed to the guide frame 31. In this way, the guide frame 31 can turn around a turning center O4 extending in the up-and-down direction, with respect to the axle support body 21. Further, in the illustrated example, the turning center O4 is located at a central portion in the front-and-back and right-and-left directions of the guide frame 31.

The steering mechanism 15 is for changing a steering angle of the tire 12 in conjunction with the turning of the guide frame 31 around the turning center O4. The steering mechanism 15 has a steering arm 72 which oscillates integrally with the tire 12 (the axle hub 16) on the basis of each kingpin described above, and a steering rod 73 connecting each steering arm 72 and the guide frame 31 to each other.

The steering rod 73 extends along the right-and-left direction. An outer end portion of the steering rod 73 is pin-connected to a front end portion of the steering arm 72 and an inner end portion is pin-connected to the guide frame 31.

That is, if the guide frame 31 turns about the turning center O4, the steering rod 73 is displaced according to the turning, thereby rotating the axle hub 16 around the kingpin through the steering arm 72. In this way, the tire 12 is steered.

In the vehicle 1 configured in this manner, if the main guide wheel 33a comes into contact with the main guide rail 6a during traveling, the main guide wheel 33a rolls and a reaction force is applied toward the main guide wheel 33a from the main guide rail 6a. If the main guide wheel 33a receives the reaction force, the main guide wheel 33a presses the cross beam 35 of the guide frame 31 described above, toward the inside in the right-and-left direction, whereby the guide frame 31 turns around the turning center O4.

For example, in a case where the vehicle 1 travels on a curved section of the track 5, the main guide wheel 33a which is located in the front and on the outside rail side, among the respective main guide wheels 33a, receives a reaction force which is directed to the inside in the right-and-left direction, from the main guide rail 6a which is disposed on the outside rail side of the curved section. Then, the reaction force that the main guide wheel 33a which is located in the front and on the outside rail side receives is transmitted to the cross beam 35 on the front side in the guide frame 31, whereby the guide frame 31 turns around the turning center O4. Further, the turning amount of the guide frame 31 changes according to the magnitude of the radius of curvature of the main guide rail 6a.

Then, if the guide frame 31 turns around the turning center O4, the steering rod 73 is displaced according to the turning, thereby rotating the axle hub 16 around the kingpin through the steering arm 72. In this way, the tire 12 is steered according to the radius of curvature of the curved section, whereby it is possible to cause the vehicle 1 to smoothly travel along the curved section.

Figure 5:
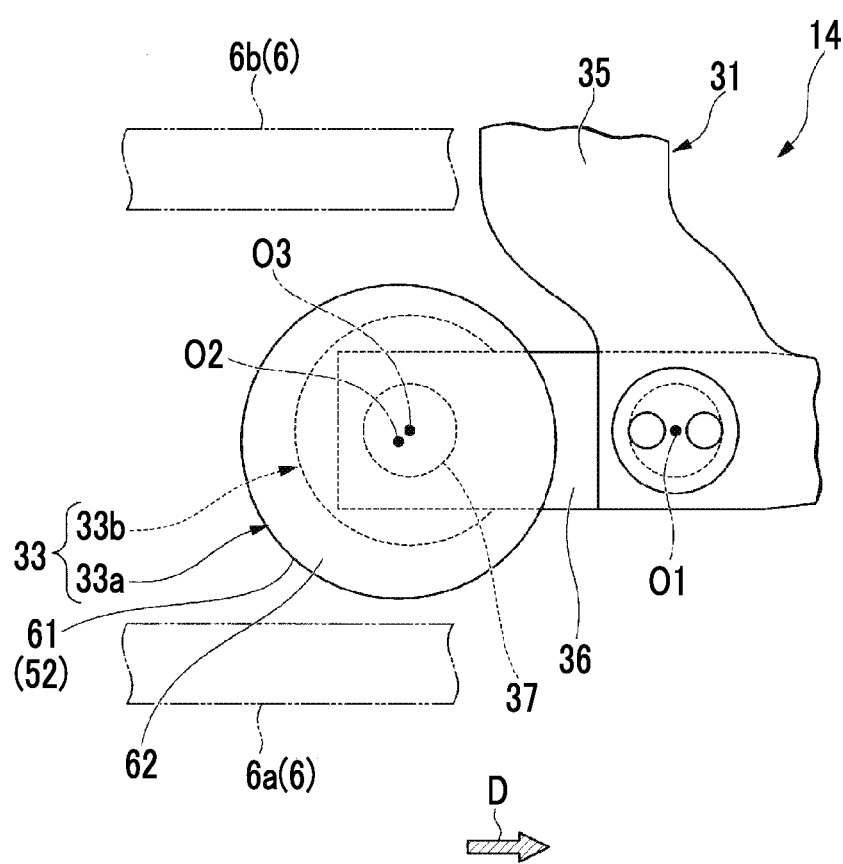
FIG. 5 is a plan view corresponding to FIG. 3 in a case where a guide wheel according to each embodiment of the present invention is located at an intermediate position.

Here, as shown in FIG. 3, in a case of checking the wear situation of the main guide wheel 33a at the maintenance of the steering guide device 14 of this embodiment, the main guide wheel 33a is checked by visual observation from above. Then, as shown in FIG. 5, at the point of time when it has been checked that wear progressed to the first protrusion 63a of the main guide wheel 33a, the adjustment of the eccentric position of the main guide wheel 33a is performed. Specifically, the eccentric position is adjusted from the initial position to the intermediate position by rotating the main guide wheel shaft 41 (refer to FIG. 4) around the shaft center O3 of the wheel shaft 37 through the adjustment mechanism (not shown). In this way, the main guide wheel shaft 41 moves to the outside in the right-and-left direction with respect to the initial position, and thus it becomes possible to maintain the guide width at a desired width.

Figure 6:
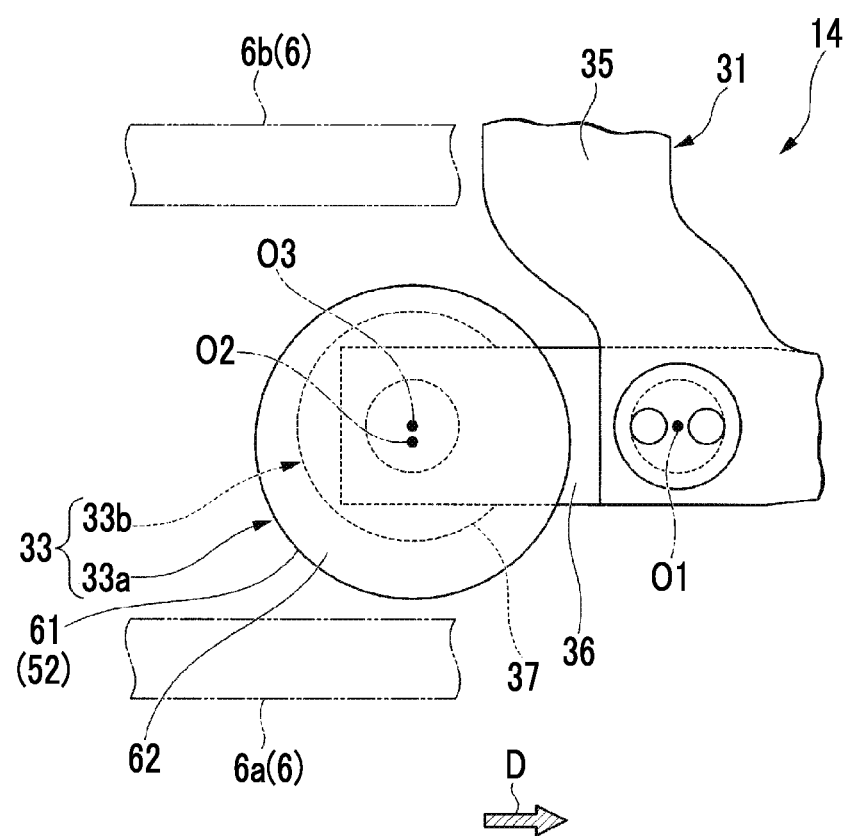
FIG. 6 is a plan view corresponding to FIG. 3 in a case where the guide wheel according to each embodiment of the present invention is located at a final position.

Further, as shown in FIG. 6, in a case where it was checked that the wear of the main guide wheel 33a progressed to the second protrusion 63b, the eccentric position of the main guide wheel 33a is adjusted from the intermediate position to the final position. Further, the adjustment of the eccentric position from the intermediate position to the final position can be performed by the same procedure as the method described above. In this way, the main guide wheel shaft 41 moves further toward the outside in the right-and-left direction than the intermediate position, whereby a desired guide width can be maintained. Further, thereafter, in a case where it was checked that the wear further progressed, work of replacing the main guide wheel 33a is performed.

In this manner, according to this embodiment, by forming the protrusions 63a and 63b at the sidewall sections 62 of the main guide wheel 33a, it is possible to check the wear situation of the main guide wheel 33a by visual observation. In this way, compared to a case of checking the wear situation by using a scale, a jig, or the like, as in the related art, maintenance work becomes easy, and thus it is possible to attain improvement in maintainability.

Further, the limit of wear can be determined based on the distances between the tread section 61 and the protrusions 63a and 63b along the radial direction, and therefore, it becomes easy to perform the management of a time for replacement, an adjustment time of the eccentric position, or the like for each main guide wheel 33a.

Moreover, in this embodiment, the protrusions 63a and 63b are formed at the sidewall sections 62, whereby with respect to the main guide wheels 33a provided such that the axial directions coincide with each other in the up-and-down direction, it is possible to check the wear situation in a planar view when the main guide wheels 33a are viewed from the axial direction. Therefore, for example, compared to a case where a wear indicator is formed at the tread section 61 of the main guide wheel 33a and the wear situation is checked in a side view as viewed from the radial direction of the main guide wheel 33a, it is possible to further improve maintainability.

Incidentally, the main guide wheel 33a of the steering guide device 14 is not always rotating during the traveling of the vehicle 1 and begins to rotate at the point of time when it has come into contact with the main guide rail 6a. Therefore, there is a concern that so-called abnormal wear in which the wear situation of the tread section 61 varies in the circumferential direction may occur. As an example of the abnormal wear, there is polygonal wear in which the tread section 61 is worn away in a polygonal shape in a planar view as viewed from the axial direction, flat wear in which a portion of the tread section 61 is locally worn away in a planar shape, or the like.

However, in this embodiment, the protrusions 63a and 63b are formed over the entire circumference of the sidewall section 62. Therefore, in a case where the abnormal wear has occurred, the occurrence of the abnormal wear can be easily determined based on the distance between an occurrence portion of the abnormal wear along the radial direction and each of the protrusions 63a and 63b being different from the distance between a portion other than the occurrence of the abnormal wear and each of the protrusions 63a and 63b.

Further, the plurality of protrusions 63a and 63b are provided at intervals in the radial direction, and therefore, it also becomes possible to determine the wear situation of the tread section 61 in stages. In this way, it is possible to appropriately determine an adjustment time of the eccentric position, a time for replacement, or the like of the main guide wheel 33a.

Further, the wear indicator is provided by the protrusions 63a and 63b, whereby it becomes easy to visually determine the wear situation.

Further, the vehicle 1 and the steering bogie 2 of this embodiment are provided with the guide wheels described above, and therefore, the vehicle 1 and the steering bogie 2 in which maintainability is excellent and stable traveling is possible can be provided.

[Modification Example]

In addition, in the embodiment described above, a case where the protrusions 63a and 63b protruding outward in the axial direction are formed at the sidewall sections 62 has been described. However, the formation positions of the protrusions 63a and 63b are not limited thereto.

Figure 8:
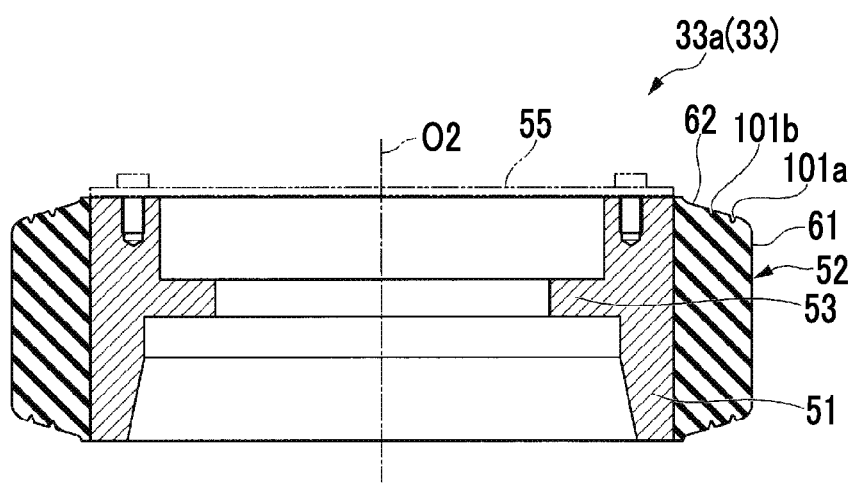
FIG. 8 is a cross-sectional view corresponding to FIG. 7(b) in a modification example of the first embodiment.

For example, as shown in FIG. 8, concave groove portions 101a and 101b recessed inward in the axial direction may be formed over the entire circumference in the sidewall sections 62. Each of the groove portions 101a and 101b has a triangular shape in which the width along the radial direction is gradually reduced as it goes inward in the axial direction, in a side view as viewed from the radial direction. Further, the groove portions 101a and 101b include a first groove portion 101a disposed to be spaced apart inward in the radial direction from the tread section 61, and a second groove portion 101b disposed to be spaced apart inward in the radial direction from the first groove portion 101a.

According to this configuration, the same operation and effects as those in the embodiment described above exhibit.

[Second Embodiment]

Next, a second embodiment of the present invention will be described. This embodiment is different from the above-described first embodiment in that the wear indicator is formed at the tread section 61. In addition, in the following description, the same configurations as those in the above-described first embodiment are denoted by the same reference numerals and description is omitted.

Figure 9A:
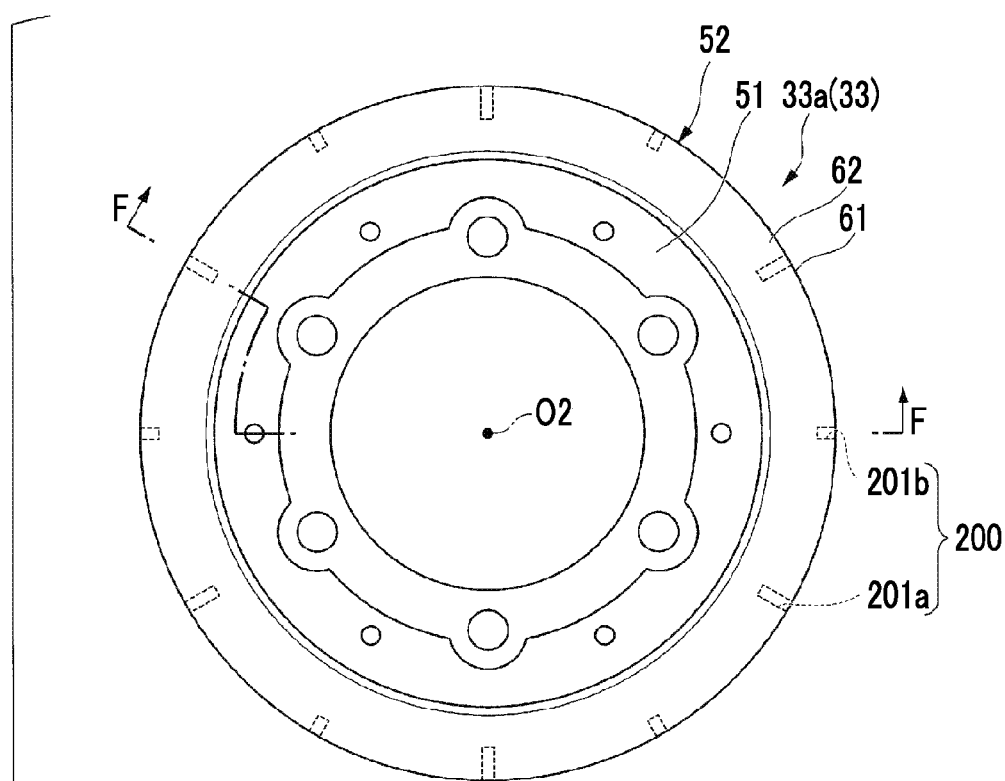
FIG. 9(a) is a plan view of a main guide wheel in a second embodiment.
Figure 9B:
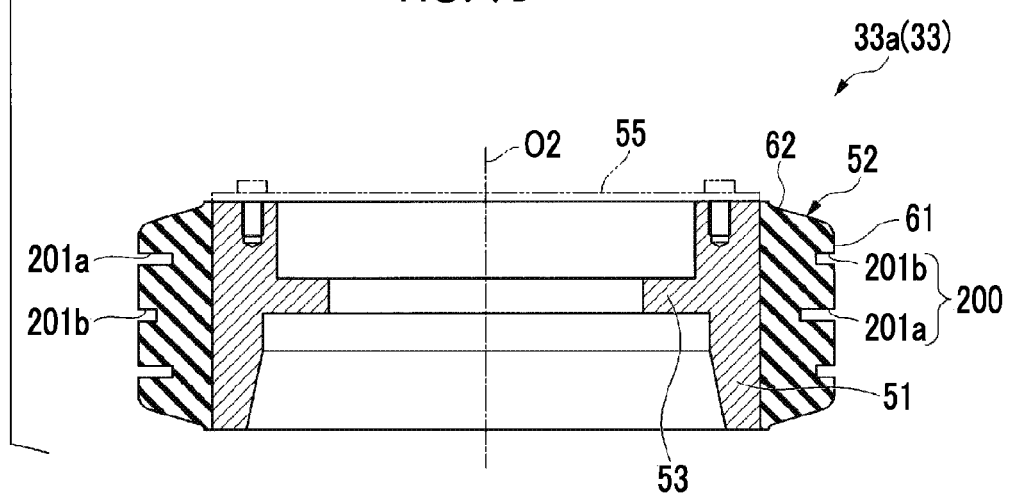
FIG. 9(b) is a cross-sectional view taken along line F-F of FIG. 9(a).

As shown in FIG. 9, a wear indicator 200 of this embodiment is provided with a plurality of hole portions 201a and 201b recessed inward in the radial direction in the tread section 61 of the main guide wheel 33a. The hole portions 201a and 201b include a first hole portion 201a, and a second hole portion 201b in which a depth along the radial direction is shallower than that of the first hole portion 201a. The first hole portion 201a and the second hole portion 201b are alternately arranged to be spaced apart from each other in each of the axial direction and the circumferential direction. That is, an array is made such that the hole portions adjacent to one hole portion (for example, the first hole portion 201a) in the axial direction and the circumferential direction, out of the first hole portion 201a and the second hole portion 201b, become the other hole portions (for example, the second hole portions 201b).

According to this configuration, the shape in a side view of the tread section 61 when viewed from the radial direction changes according to the wear situation of the tread section 61. Specifically, in a case where the wear of the tread section 61 has progressed from the initial state which is a state where the first hole portion 201a and the second hole portion 201b are exposed to the outside, the second hole portion 201b disappears and only the first hole portion 201a remains. Thereafter, the wear further progresses, whereby the first hole portion 201a also disappears. In this way, it is possible to check the wear situation of the tread section 61 by visual observation, and thus it is possible to attain improvement in maintainability.

Further, the main guide wheel 33a is formed of a material having light permeability, and therefore, the inside of the main guide wheel 33a becomes visible. In this case, the wear situations of the hole portions 201a and 201b formed in the tread section 61 can be checked in a planar view when the main guide wheel 33a is viewed from above. In this way, it is possible to attain improvement in maintainability.

[Modification Example]

In addition, in the second embodiment described above, a configuration in which the wear indicator 200 is provided with the plurality of hole portions 201a and 201b in which the depths along the radial direction are different has been described. However, the configuration of the wear indicator 200 is not limited thereto. For example, as shown in FIG. 10, a hole portion 202 in which an inner diameter varies as it goes inward in the radial direction may be configured as a wear indicator 203.

Figure 10:
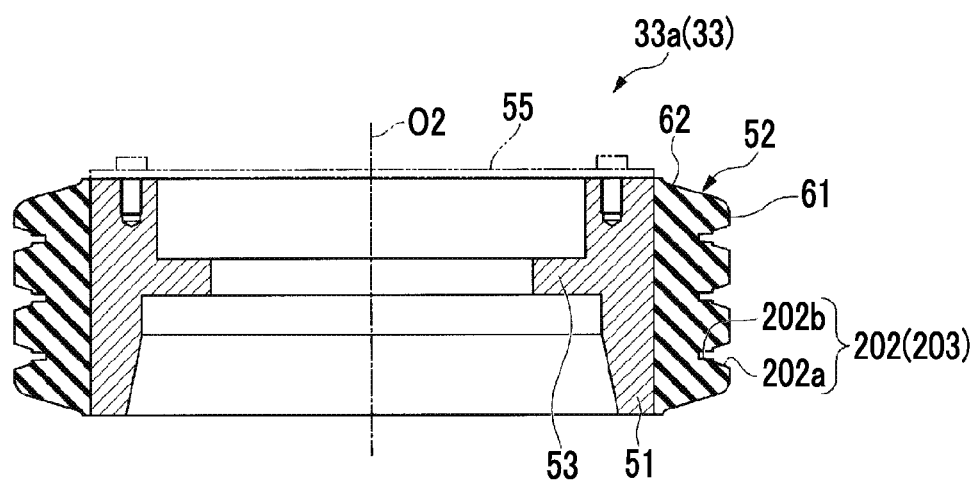
FIG. 10 is a cross-sectional view corresponding to FIG. 9(b) in a modification example of the second embodiment.

Specifically, the hole portion 202 shown in FIG. 10 is made as a stepped hole in which an inner diameter is gradually reduced as it goes inward in the radial direction, and has a large-diameter portion 202a, and a small-diameter portion 202b continuously provided on the inside in the radial direction in the large-diameter portion 202a. Then, the hole portions 202 are formed at intervals in the circumferential direction and the axial direction in the tread section 61. Further, in the illustrated example, a hole row in which twelve hole portions 202 are arranged at intervals in the circumferential direction is formed in three rows at intervals in the axial direction.

According to this configuration, the inner diameter of the hole portion 202 which is exposed to the outside changes to a state where the large-diameter portion 202a is exposed to the outside, and a state where the large-diameter portion 202a is shaved off due to wear, whereby the small-diameter portion 202b is exposed to the outside. In this way, the shape in a side view of the tread section 61 when viewed from the radial direction changes according to the wear situation of the tread section 61, and thus it is possible to check the wear situation of the tread section 61 by visual observation.

In addition, the technical scope of the present invention is not limited to the above-described embodiments and includes various changes applied to the above-described embodiments within a scope which does not depart from the gist of the present invention. That is, specific structures, shapes, or the like mentioned in the embodiments is merely an example, and changes can be appropriately made.

For example, in the embodiments described above, a configuration in which the steering bogie according to the present invention is adopted to a vehicle of a track based transportation system has been described. However, there is no limitation thereto, and it is possible to adopt the steering bogie according to the present invention to various vehicles.

Further, in the embodiments described above, a configuration in which the steering mechanism 15 which steers the tires 12 according to the displacement of the steering guide device 14 is provided has been described. However, a configuration is also acceptable in which the steering mechanism 15 is not provided, such as a bogie truck, for example.

Further, in the embodiments described above, a case where the wear indicator (the protrusions 63a and 63b, the groove portions 101a and 101b, or the respective hole portions 201a, 201b, and 202) is formed such that the wear situation can be determined in two stages has been described. However, the configuration of the wear indicator is not limited thereto and may be formed such that the wear situation can be determined, for example, in one stage or multiple stages which are three or more stages.

Further, with respect to the shapes of the protrusions 63a and 63b, the groove portions 101a and 101b, or the hole portions 201a, 201b, and 202, a change in design can be appropriately made.

Further, in the first embodiment described above, a case where as the wear indicator, the protrusions 63a and 63b or the groove portions 101a and 101b are formed in the sidewall sections 62 has been described. However, the configuration of the wear indicator is not limited thereto. For example, a mark or the like is also acceptable.

Further, in the second embodiment described above, a case where as the wear indicators 200 and 203, hole portions are formed at intervals in the circumferential direction and the axial direction of the tread section 61 has been described. However, the configurations of the wear indicators 200 and 203 are not limited thereto, and for example, groove portions extending over the entire circumference in the circumferential direction may be provided. In this case, the groove portion is formed such that a width is reduced as it goes inward in the radial direction, whereby the width of the groove portion which is exposed to the outside changes according to the progress of wear. In this way, the shape in a side view of the tread section 61 when viewed from the radial direction changes according to the wear situation of the tread section 61, and thus it is possible to check the wear situation of the tread section 61 by visual observation.

Further, in the embodiments described above, a configuration in which the main guide wheel 33a is formed of a material having light permeability has been described. However, the material of the main guide wheel 33a is not limited thereto, and the main guide wheel 33a can be formed of various materials.

Further, the wheel main body 52 is not limited to an elastic body and may be made of metal (iron, copper, aluminum, or the like).

In this case, it is preferable that the fixing of the wheel main body 52 to the core metal section 51 is performed by press fitting by a cylindrical shape or a serration shape, screwing, a stopper, or the like, rather than cure adhesion.

Further, in the embodiments described above, a configuration in which the present invention is applied to the main guide wheel 33a has been described. However, an application target of the present invention is not limited thereto, and it is also possible to apply the present invention to the switching guide wheel 33b.

Further, in the embodiments described above, a configuration in which the main guide wheel 33a is solid has been described. However, the configuration of the main guide wheel 33a is not limited thereto, and the main guide wheel 33a may be hollow.

Further, in the embodiments described above, a configuration in which the main guide wheel 33a is mounted eccentrically with respect to the wheel shaft 37 has been described. However, the configurations of the main guide wheel 33a and the wheel shaft 37 are not limited thereto, and the main guide wheel 33a may be mounted coaxially with the wheel shaft 37.

INDUSTRIAL APPLICABILITY

In the guide wheel, the steering bogie, and the vehicle according to the present invention, the protrusions are provided over the entire circumference in the circumferential direction in the sidewall sections of the guide wheel. In this way, the wear situation can be easily determined, and thus it is possible to improve maintainability.

REFERENCE SIGNS LIST

1: vehicle
2: steering bogie
3: car body
5: track
6: guide rail
6a: main guide rail (guide rail)
6b: switching guide rail (guide rail)
11: axle
12: tire (running wheel)
14: steering guide device
33: guide wheel
33a: main guide wheel (guide wheel)
33b: switching guide wheel (guide wheel)
61: tread section
62: sidewall section
63a: first protrusion (wear indicator)
63b: second protrusion (wear indicator)
101a: first groove portion (wear indicator)
101b: second groove portion (wear indicator)
200, 203: wear indicator
201a: first hole portion (hole portion)
201b: second hole portion (hole portion)
202: hole portion

The invention claimed is:

1. A guide wheel comprising:
an annular tread section which comes into contact with a guide rail extending along a track; and
a pair of sidewall sections which are respectively provided to be continuous with both end edges in an axial direction of the tread section and extend inward in a radial direction,
wherein a vehicle is guided along the track by a guide wheel,
wherein the guide wheel is connected to a wheel shaft extending toward an up-and-down direction of the vehicle on a shaft center which is eccentric with respect to a shaft center of the wheel shaft,
wherein an eccentric position of the guide wheel is capable of being adjusted at three stages which are an initial position at which the shaft center is spaced apart from the shaft center of the wheel shaft in a front-and-back direction of the vehicle, a final position at which the shaft center is located on an outside of the shaft center of the wheel shaft in a right-and-left direction of the vehicle, and an intermediate position which is located between the initial position and the final position,
wherein in each sidewall section, a wear indicator is provided over an entire circumference in a circumferential direction,
wherein a plurality of the wear indicators are provided at intervals in the radial direction,
wherein each of the plurality of the wear indicators has a concave shape or a protrusion shape along the axial direction,
wherein the plurality of the wear indicators include a first protrusion disposed to be spaced apart inward in the radial direction from the tread section, and a second protrusion disposed to be spaced apart inward in the radial direction from the first protrusion, or include a first groove portion disposed to be spaced apart inward in the radial direction from the tread section, and a second groove portion disposed to be spaced apart inward in the radial direction from the first groove portion,
wherein the first protrusion and the first groove portion are formed so that the eccentric position is configured to be adjusted from the initial position to the intermediate position at a point of time when it has been checked that wear progressed to the first protrusion and the first groove portion, and
wherein the second protrusion and the second groove portion are formed so that the eccentric position is configured to be adjusted from the intermediate position to the final position at a point of time when it has been checked that wear progressed to the second protrusion and the second groove portion.

2. The guide wheel according to claim 1, wherein the guide wheel is configured of a material having light permeability.

3. A steering bogie comprising:
running wheels connected to an axle; and
a steering guide device which is guided by the guide rails,
wherein the steering guide device has the guide wheel according to claim 1.

4. A vehicle comprising:
a car body; and
the steering bogie according to claim 3, which is provided at a lower portion of the car body.

5. A guide wheel comprising:
an annular tread section which comes into contact with a guide rail extending along the track; and
a pair of sidewall sections which are respectively provided to be continuous with both end edges in an axial direction of the tread section and extend inward in a radial direction,
wherein a vehicle is guided along a track by the guide wheel,
wherein the guide wheel is connected to a wheel shaft extending toward an up-and-down direction of the vehicle on a shaft center which is eccentric with respect to a shaft center of the wheel shaft,
wherein an eccentric position of the guide wheel is capable of being adjusted at three stages which are an initial position at which the shaft center is spaced apart from the shaft center of the wheel shaft in a front-and-back direction of the vehicle, a final position at which the shaft center is located on an outside of the shaft center of the wheel shaft in a right-and-left direction of the vehicle, and an intermediate position which is located between the initial position and the final position,
wherein a wear indicator which is recessed inward in the radial direction and in which a shape in a side view of the tread section when viewed from the radial direction changes according to wear is provided in the tread section,
wherein the wear indicator is a plurality of hole portions in which depths along the radial direction are different,
wherein the plurality of hole portions include a first hole portion, and a second hole portion in which a depth along the radial direction is shallower than that of the first hole portion,
wherein the second hole portion is formed so that the eccentric position is configured to be adjusted from the initial position to the intermediate position at a point of time when it has been checked that wear progressed to cause the second hole portion to disappear, and
wherein the first hole portion is formed so that the eccentric position is configured to be adjusted from the intermediate position to the final position at a point of time when it has been checked that wear progressed to cause the first hole portion to disappear.

6. The guide wheel according to claim 5, wherein the wear indicator is a hole portion having an inner diameter which is reduced as it goes inward in the radial direction.

* * * * *